H. CROSS.

SHOCK ABSORBER.

APPLICATION FILED JUNE 23, 1921.

Reissued Sept. 20, 1921. 15,197.

Inventor
Harry Cross
Williams, Bradbury,
Sea, & McCaleb
Attys

UNITED STATES PATENT OFFICE.

HARRY CROSS, OF WOODSTOCK, ILLINOIS.

SHOCK-ABSORBER.

15,197. Specification of Reissued Letters Patent. Reissued Sept. 20, 1921.

Original No. 1,326,850, dated December 30, 1919, Serial No. 327,877, filed October 2, 1919. Application for reissue filed June 23, 1921. Serial No. 479,925.

*To all whom it may concern:*

Be it known that I, HARRY CROSS, a citizen of the United States, formerly a resident of Montreal, in the Province of Quebec and Dominion of Canada, and now a resident of Woodstock, in the county of McHenry and State of Illinois, have invented certain new and useful Improvements in Shock-Absorbers, of which the following is a full, clear, concise, and exact description, reference being had to the accompanying drawings, forming a part of this specification.

This invention relates to shock absorbers and it is particularly designed to be used in connection with automobiles, although it is not to be restricted to such use.

The primary object of the invention is to provide an improved shock absorber, having means for controlling the movement or vibrations of the spring-supported body of a vehicle relative to the running gear of the same, which does not affect the action of the vehicle springs in compressing, but prevents, as much as possible, the rebound or upward movement of the body of the vehicle which is extremely uncomfortable to the occupants of the vehicle, and is severe on the springs, oftentimes causing them to become broken.

Another object of the invention is to provide a device of the above mentioned character which is simple in construction, effective in operation, strong, durable and inexpensive to manufacture.

Other objects and advantages of the invention will be apparent during the course of the following description.

In the accompanying drawings forming a part of this specification and in which like numerals are employed to designate like parts throughout the same, Figure 1 is a side elevation illustrating the manner of attaching my improved shock absorber to a spring-supported vehicle.

Figure 1:
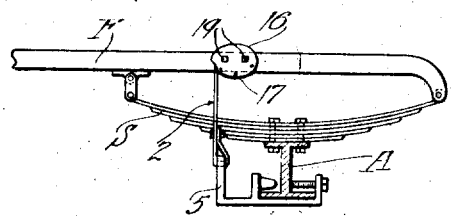
Figure 2:
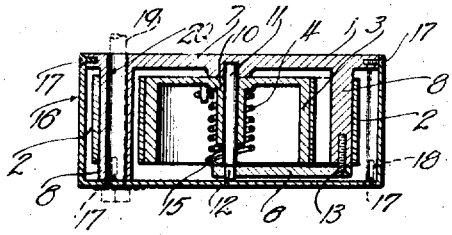
Fig. 2 is a horizontal section taken on line 2—2 of Fig. 3.
Figure 3:
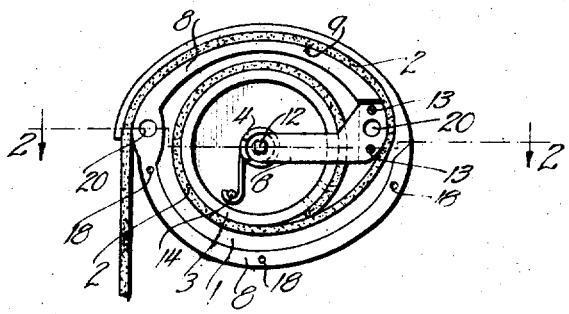
Fig. 3 is a side elevation of the device constructed in accordance with my invention.

In the drawings, wherein for the purpose of illustration is shown a preferred embodiment of the invention, E indicates a portion of the automobile frame which is carried on the usual springs S and axle A, and with which my improved shock absorbing device is associated.

In carrying out my invention I employ a casing or housing 1 which is provided with a friction track over which a belt or strap 2 is adapted to slide. One end of the belt 2 is secured to a drum 3 which is mounted for rotation within the casing 1 and is adapted to wind or cause the belt to be wound thereon. Such action of the drum 3 is caused by a coiled spring 4 which is arranged in a novel manner in the casing. The other end of the band 2 is connected to a clamping member or bracket 5 carried by the axle A. I also employ novel means 6 to adjust the tension of the spring 4.

The casing or housing 1 is preferably semi-oval-shaped in configuration and includes a plate 7 which has a flange 8 extending outwardly therefrom. A portion of this flange forms a friction track 9 over which the belt 2 slides. Cast integral with drum 3 and extending in the same direction as the flange 8 is a centrally disposed sleeve or hub 10 around which the spring 4 is disposed. This hub serves to prevent, as much as possible, wiggling or side motion of the drum which might otherwise occur.

In order to adjust the tension of the spring 4, I employ spring tightening arm, or wrench, 6 which is carried by a pin 11 loosely fitted in the hub 10. Although the pin 11 may be of any other construction I preferably make it cylindrical and extend one end of it beyond the end of the sleeve 10 in which it revolves. The inner end of the spring tightening arm 6 is provided with a square aperture which fits over the reduced square end 12 of the pin 11 and permits the pin to be rotated in the sleeve 10 when the member 6 is moved in a rotary direction. The opposite or outer end of the arm 6 is detachably secured to the friction flange 8 by means of screws 13. The spring 4 has one of its ends hooked or anchored around a pin 14 projecting from the drum 3 and the other end is connected to a lateral projection or lug 15 carried by the pin 11. Hence, it will be seen that when the arm 6 is rotated from left to right the spring will be wound tighter, and it is in this manner that the tension of said spring is adjusted.

The free end of the belt 2 may be anchored in any suitable manner, such as for instance, by a clamping member or bracket 5 of a construction which may be readily attached to and detached from the axle A of the vehicle.

In order to prevent and guard against the entrance of mud and dirt into the aforesaid parts, I employ a cover 16 which is attached in position by means of screws 17 which fit in holes 18 drilled in the casing 1.

The whole device is secured to the frame F by means of bolts 19 which pass through openings in the cover 16 and through openings 20 in casing 1, as shown.

When the car encounters an uneven place in the road the spring A and the frame F will be brought closer together. When this occurs, the belt 2 will become slack and by the action of the coiled spring 4 on the drum 3 the belt will be caused to wind thereon. On the immediate rebound or separation of the spring from the frame, the belt will be placed under tension and a braking action exerted thereon, thereby preventing a quick or sudden rebound of the vehicle body. In other words, when the spring S and frame F separate the belt 2 is drawn over the friction track 9 and is also subjected to the action of the spring 4, thus resulting in retarding the movement of the belt and preventing the upward throw of the vehicle body, which is objectionable to the occupants of the car and oftentimes injurious to the springs. It is not intended however, that this device interfere in any way with the compressing of the vehicle spring, it being only desired to prevent, as much as possible, the rebound of the vehicle body.

One of the salient features of the present invention resides in the fact that the drum or wheel 3 is mounted for rotation within the curve of a semi-oval shaped friction track 9. This arrangement enables me to minimize the height of that part of the device which comprises the drum and friction track, this being a feature of marked advantage because the height of the spaces on automobile frames to which shock absorbers may be applied is often, and in fact usually, very limited.

It is to be understood that the form of my invention herein shown and described is to be taken as a preferred embodiment of the same, and that various changes in the shape, size and arrangement of parts may be resorted to without departing from the spirit of the invention or the scope of the subjoined claims.

Having thus described my invention, what I claim is:

1. In a shock absorber for a vehicle, a casing including a friction track, a sleeve in said casing, a drum in said casing, a coiled spring surrounding said sleeve, a pin loosely mounted in said sleeve, said pin having one of its ends projecting beyond said sleeve, a spring tightening arm carried by said extended portion of the pin, the outer end of said arm being detachably secured to the friction track, one end of said spring being anchored to the drum and the other end to the pin, whereby when the spring tightening arm is rotated the tension of the spring is adjusted, a belt secured to said drum, said belt being adapted to slide over the friction track, and means for anchoring the other end of said belt to the vehicle.

2. In a shock absorber, a casing including a friction track, a hub in said casing, a drum in said casing, a pin in said hub, a coiled spring surrounding said hub, an arm fixed to and extending laterally from said pin and anchored in said casing, a belt secured at one of its ends to said drum, the opposite end thereof extending over the friction track in the casing, and means for anchoring the free end of the belt to an axle, substantially as set forth.

3. In a shock absorber for a vehicle, a semi-oval shaped casing including a plate having a flange extending outwardly therefrom, a portion of said flange serving as a friction track, a drum having a centrally disposed hub cast integral therewith, a spring anchoring pin in said drum adjacent the hub, a pin loosely mounted in said hub and extending beyond one end thereof, the extremity of said loosely mounted pin being reduced, a lug on the extended portion of said loosely mounted pin, a coiled spring surrounding said hub and said loosely mounted pin, one end of said spring being secured to said anchoring pin in the drum, the opposite end being fastened to the lug on said loosely mounted pin, a spring tightening arm secured to the reduced extremity of said losely mounted pin, the opposite end of said arm being detachably secured to said friction track, a belt having one of its ends secured to said drum, the opposite end being slidable over said friction track, and means to anchor the free end of said belt to a part of the vehicle.

4. A shock absorber for a vehicle body supporting spring comprising: a pair of members forming means of attachment to the vehicle parts between which the spring is interposed, a friction strap extending between said attachment members, a semi-oval friction surface carried by one of said members, a rotatable drum also carried by said last mentioned member and lying within the curve of the elliptical friction surface, said friction strap passing over said semi-oval friction surface and having one end attached to the drum, and a spring associated with said drum and exerting thereon a rotative torque tending to wind the friction strap thereon.

5. A shock absorber for a vehicle body supporting spring comprising in combination the following elements: a pair of members forming means of attachment to the vehicle parts between which the spring is interposed, a friction strap extending between the said members, a curved friction surface carried by one of said members, a rotatable drum also carried by said last mentioned member and mounted for rotation within the curve of said friction surface, said strap passing over said friction surface and having one end attached to the drum, a spring associated with said drum and exerting on said drum a rotative torque tending to wind the friction strap on said drum, and means for adjusting the tension of said spring without disassociating the drum from the friction strap or friction surface.

6. A shock absorber for a vehicle body supporting spring comprising: a curved friction track, a drum disposed within the curve of the friction track, means whereon said drum is mounted for rotation in the position stated, a friction strap passing over said friction track and having one end attached to the drum, a coiled spring having one end fixed with respect to the drum and its other end fixed with respect to the aforesaid means whereon the drum is mounted, and a device normally locking the means whereon the drum is mounted against rotation, said means whereon the drum is mounted, when unlocked, being capable of rotation to adjust the tension of said spring.

7. A shock absorber for a vehicle body supporting spring comprising: a curved friction track, a drum disposed within the curve of said friction track, a pivot pin whereon said drum is mounted for rotation in the position stated, said pin being capable of rotary movement, means normally locking said pin against rotary movement, a coiled spring disposed around said pivot pin and having one end thereof fixed with respect to the drum and its other end fixed to the pivot pin, and a friction strap passing over said friction track and having one end attached to said drum.

8. A shock absorber for a vehicle body supporting spring comprising: a member adapted to be secured to one of the vehicle parts between which the vehicle spring is interposed, a curved friction track fixed to said member, a drum pivot journaled in said member and disposed in the curve of said friction track, a drum mounted on said drum pivot for rotary movement relative thereto, a friction strap extending over said friction track and having one end attached to the drum, a coiled spring having one end thereof bearing against means fixed with respect to the drum and its other end bearing against the drum pivot, and detachable locking means normally preventing rotation of the drum pivot with respect to the member wherein it is journaled.

9. In a shock absorber, a casing including a friction track, a drum in said casing, a pin journaled in said casing and constituting a pivot for said drum, a coiled spring disposed around said pin and having its ends mechanically connected with the pin and drum, an arm extending laterally from said pin, means for anchoring said arm to the casing normally to prevent rotation of the pin relative to the casing, and a friction strap secured at one of its ends to the drum and extending over the friction track.

10. In a shock absorber, a member adapted to be fixed to one of a pair of vehicle parts between which a vehicle spring is interposed, a curved friction track carried by said member, a pivot pin disposed within the curve of said friction track and having one of its ends journaled for rotation in the first mentioned member, a bearing for the other end of the pin, the pin being incapable of rotation in said last mentioned bearing, detachable means for securing said last mentioned bearing to the first mentioned member, a drum mounted on said pivot pin, a coiled spring having one end operatively associated with the drum and its other end operatively associated with the pivot pin, and a friction strap passing over said friction track and having one end thereof attached to said drum.

11. In a shock absorber, a member adapted to be fixed to one of a pair of vehicle parts between which a vehicle spring is interposed, a curved friction track carried by said member, a pivot pin disposed within the curve of said friction track and having one of its ends journaled for rotation in the first mentioned member, the other end of the pivot pin being of polygonal cross section, a wrench coöperating with said last mentioned end of the pivot pin, detachable means for connecting said wrench to the first mentioned member to prevent rotation of the pivot pin, a drum mounted on said pivot pin, a coiled spring having one end operatively associated with the pivot pin, and a friction strap passing over said friction track and having one end thereof attached to said drum.

12. A shock absorber comprising a member adapted to be fixed to one of a pair of vehicle parts between which a vehicle spring is interposed, a friction track carried by said member, a pivot pin having one end journaled in said member and provided at its other end with a laterally extending arm, detachable means normally securing said arm to said first mentioned member to prevent rotation of the pivot pin, a drum mounted on the pivot pin, a friction strap attached to said drum and passing over said friction track, and a coiled spring interposed between the drum and pivot pin, said arm when detached from the first mentioned member serving as a means for adjusting the tension of said spring.

In witness whereof, I hereunto subscribe my name this 11th day of June, 1921.

HARRY CROSS.

Witnesses:
C. L. QUINLAN,
E. F. FUES.